United States Patent [19]

Glabe

[11] 3,718,484
[45] Feb. 27, 1973

[54] SOLIDIFIED PRODUCT FROM HIGH FRUCTOSE CORN SYRUP AND PROCESS FOR THE PREPARATION THEREOF

[75] Inventor: Elmer F. Glabe, Chicago, Ill.
[73] Assignee: Food Technology, Inc., Chicago, Ill.
[22] Filed: Aug. 20, 1970
[21] Appl. No.: 65,737

[52] U.S. Cl. .................................. 99/199, 99/142
[51] Int. Cl. .......................................... A23l 1/08
[58] Field of Search ............... 99/142, 141, 146, 199

[56] References Cited

UNITED STATES PATENTS 2,693,420 11/1954 Straub ............................... 99/141 R
3,264,117 8/1966 Graham ............................. 99/141 R Primary Examiner—A. Louis Monacell
Assistant Examiner—J. M. Hunter
Attorney—Johnston, Root, O'Keeffe, Keil, Thompson & Shurtleff

[57] ABSTRACT

Dehydrating high fructose corn syrup by slurrying the syrup with ungelatinized starch having a gelatinization temperature of at least 150°F heating the slurry at 15° to 30° degrees below the gelatinization temperature of the starch to condition the starch such that it will only partially gelatinize when the slurry is dried; subsequently drying the slurry in a thin film on a heated surface while simultaneously partially gelatinizing the starch therein.

10 Claims, No Drawings

SOLIDIFIED PRODUCT FROM HIGH FRUCTOSE CORN SYRUP AND PROCESS FOR THE PREPARATION THEREOF

BACKGROUND OF THE INVENTION

The term "high fructose corn syrup" as used herein refers to a corn syrup in which the solids content is a minimum of at least 40 percent by weight fructose (levulose), at least 40 percent by weight dextrose and the remainder higher saccharides, chiefly maltose. The water content can vary but is usually around 29.0 percent by weight. The mineral content is small, usually about 0.05 percent by weight. A typical high fructose corn syrup contains 29.0 percent water and 71 percent solids. The solids consist essentially of 42 percent fructose, 50.0 percent dextrose and 8.0 percent higher saccharides, chiefly maltose.

In contrast to regular corn syrups that can be spray dried, this high fructose corn syrup cannot be spray dried satisfactorily because of its composition. Regular corn syrups have the following composition (Proceedings of the 37th Annual Meeting of the Bakery Engineers-1961, page 103, Table 3):

|  | % By Weight | | |
|---|---|---|---|
|  | Regular | Medium | High |
| Water | 19.7 | 19.3 | 18.2 |
| Solids | 80.3 | 80.7 | 81.8 |
| Ash (Mineral) | 0.3 | 0.4 | 0.3 |

The solids of corn syrup is all carbohydrate with the exception of the small amount of ash or mineral material. The composition of the carbohydrate fraction is as follows:

|  | % By Weight | | |
|---|---|---|---|
| Dextrose | 19.3 | 9.1 | 37.0 |
| Maltose | 14.3 | 51.9 | 31.5 |
| Higher Saccharides | 66.4 | 39.0 | 31.5 |

The contrast in composition of the high fructose corn syrup and regular corn syrup is quite evident.

Another type of sugary syrup that has been difficult to dry is liquid honey. Honey has the following composition (average of 490 samples of liquid honey Table 1, page 11, "Composition of American Honey," United States Department of Agriculture Research Technical Bulletin 1M-2b):

|  | % By Weight | |
|---|---|---|
|  | Normal Moisture Basis | Solids Calculated to a dry Basis |
| Water | 17.200 | — |
| Fructose | 38.190 | 46.200 |
| Dextrose | 31.280 | 37.705 |
| Sucrose | 1.310 | 1.582 |
| Maltose | 7.310 | 8.828 |
| Higher Saccharides | 1.500 | 1.810 |
| Ash | 0.169 | 0.204 |
| Nitrogen | 0.041 | 0.050 |
| Undetermined | 3.000 | 3.621 |
| Totals: | 100.000 | 100.000 |

Comparing liquid honey with high fructose corn syrup, it is quite evident that the fructose content in the latter is relatively close to that of liquid honey. However, liquid honey contains an appreciable quantity of sucrose and also nitrogen or protein. Furthermore, the quantity of dextrose in high fructose corn syrup is very appreciably higher than that in liquid honey. It is these characteristics of high fructose corn syrup which makes the dehydration of it a difficult procedure, requiring a unique and novel approach. Of even greater importance is the stabilizing of the dried product so that is will be substantially non-hygroscopic.

Straub, U.S. Pat. No. 2,693,420 describes the preparation of a solidified honey product using a starch material in the process. According to the patentee various kinds of starches can be used including rice, potato, waxy maize, sweet potato, tapioca and arrowroot. The starch can be gelatinized or pre-gelatinized or otherwise modified. Wheat flour and other starch containing flours can be used. The starch material is mixed with the liquid honey and the mixture heated on trays in a tunnel drier or in a pan-type evaporator under vacuum. Subsequently, the dried product is crushed, pulverized or ground. Alternatively, the honey-starch mixture can be mixed with water and dried on a roller drier or a spray drier.

The procedures specifically outlined by Straub do not give satisfactory results when applied to high fructose corn syrup.

While it is possible to use the high fructose corn syrup in its liquid form, it would be desirable to provide a solidified high fructose-containing product in the form of a dry appearing flowable powder similar to can sugar. Ordinary can sugar, although hygroscopic, maintains its free-flowing properties. A solid product which is free-flowing has a number of advantages, especially in making food products, for example, bread, cakes, pastries, ice cream and the like.

OBJECTS

In view of the foregoing desiderata, it is one of the objects of this invention to make a new and useful solidified product from high fructose corn syrup in the form of a dry appearing flowable powder, free of gummy, sticky and lumpy charactristics, which retains its stability against hygroscopicity.

Another object is to provide a new and improved process for making a dehydrated high fructose product from high fructose corn syrup.

A further object is to provide a new and useful composition containing high fructose corn syrup solids and honey solids.

An additional object is to provide a unique and unobvious process for producing a composite of high fructose corn syrup solids and honey solids in the form of a dry appearing flowable powder, free of gummy, sticky and lumpy characteristics, which retains its stability against hygroscopicity. Other objects will appear hereinafter.

BRIEF SUMMARY OF THE INVENTION

In accordance with the invention high fructose corn syrup is dehydrated by intimately mixing said syrup with an ungelatinized starch having a gelatinization temperature of at least 150° F. in sufficient amount to form a slurry, heating said slurry at a temperature 15° to 30° below the gelatinization temperature of said starch until the starch is conditioned to the extent that it will only partially gelatinize when subsequently heated above the gelatinization temperature, and subsequently heating said slurry above said gelatinization temperature to dehydrate said slurry and to partially gelatinize said starch, the quantity of said starch and the degree of gelatinization being sufficient to give a product which when ground forms a dry appearing flowable powder, free of gummy, sticky and lumpy characteristics.

If desired, a portion of the high fructose corn syrup can be replaced by honey. Deaerating agents (emulsifiers) are preferably added and anti-humectants can be added to the product.

The product consists essentially of the following ingredients:

| | Parts By Weight |
|---|---|
| High fructose corn syrup solid | 40–70 |
| Partially gelatinized starch of a type having a gelatinization temperature of at least 150°F. | 60–30 |
| Honey solids | 0–60 |
| Water | 0.5–4.0 |
| Emulsifier | 0–1 |
| Anti-humectant | 0–1 |

DETAILED DESCRIPTION OF THE INVENTION

In order to obtain optimum results the slurry of ungelatinized starch and high fructose corn syrup (with or without honey) is deaerated during heating. Deaeration is facilitated by adding a small amount of an emulsifier, for example, 0.2 to 0.8 percent and usually not exceeding 1 percent of total solids. Emulsifiers contain both hydrophile and hydrophobe groups and are effective in causing the release of entrapped air. The deaeration which occurs can be observed by examination of the slurry under a microscope. A preferred deaerator is hydroxylated lecithin. Other suitable emulsifiers are glycerol mono- and di-stearate or any of the polyoxyethylated emulsifiers normally used in making bread and other bakery products.

The ungelatinized starch employed in the process is preferably wheat starch which has a gelatinization temperature around 160° F. Other examples of suitable starches are corn and rice starch. Wheat starch and rice starch are superior to corn starch because they are bland in flavor, whereas corn starch carries a definite flavor characteristic which it imparts to the finished dried product.

Modified grain starches of the types indicated above may be usable provided that the temperature required for gelatinization is not lower than 150° F. Wheat flour, corn flour, and rice flour are all usable materials in place of the corresponding extracted starches. However, the flavor of the flour in each case is definitely stronger than that of the extracted starch. Therefore, although the flours can be used from a technical standpoint, they are not very feasible for use from a commercial standpoint relative to the taste of the finished dried product.

Root starches such as tapioca and potato are not very successful; in fact, they are almost impossible to use because of their lower gelatinization temperature thereby providing the possibility for too much gelatinization during the drying step.

After the slurry is conditioned by heating it at a temperature 15° to 30° below the starch gelatinization temperature until it will partially gelatinize during dehydration, the slurry is dried.

The method of drying is very important. This invention preferably uses the method of thin-film drying. This can be accomplished in a number of ways on commercial drying equipment. These are a double drum hot roll drier, either operated at atmospheric pressures or in a vacuum chamber, and tray driers or conveyor driers, again operated either at atmospheric pressures or in a vacuum chamber. The essential feature of the drying method is to subject a thin film of the high fructose corn syrup slurry (with or without honey) to a heated surface. The temperature of this surface is usually controlled in a range of 325° to 375° F. Exposure of the film to the surface is brief, consisting of approximately five seconds to thirty seconds.

The principle involved in this method of drying is to combine the high fructose corn syrup with starch. During the exposure of the syrup and starch slurry to the highly heated drying surface, the starch becomes partially gelatinized in situ. Under these conditions, the water in the syrup is rapidly transferred from the sugar molecules to the starch molecules, permitting the latter to become partially gelatinized and then forcing the starch granules to release the water by evaporation. The resulting dried composition, if properly made, shows the presence of partially gelatinized starch. There is some evidence to indicate that the starch and the sugar have combined chemically, since the sugar cannot again be extracted from the dried product and returned to its original form. Similarly, the starch cannot be extracted or separated from the sugar. Microscopic examinations show that the starch is partially gelatinized and not totally gelatinized or disorganized.

The double drum hot roll drier is the preferred method of accomplishing the thin film drying step. Using this equipment, it is possible to adjust the surface temperature of the rollers by means of controlling the steam pressure entering the double drums. It should be understood, however, that other methods of effecting thin film drying are known and therefore will be applicable to the principle of this invention. The drying equipment, although important, is secondary to the thin film drying principle.

This invention also encompasses the commercial aspects of operating a drying process. In short, a drying process must meet the requirements of low cost to make the invention feasible from a commercial standpoint. In terms of the drying process, this means that the raw slurry going to the driers must be easily handled and the dried material coming from the driers must also be in such condition that it can be handled with ease and can be converted into a granular or powdered mass quickly and easily. It must obviously also remain in this condition over long periods of time. This invention encompasses all of these commercial features.

The drying procedure consists of mixing the high fructose corn syrup with wheat starch to yield a smooth homogeneous, semiviscous slurry. This slurry is pumped to the double drum hot roll drier (or other drier). The double drums rotating counter to each other pick up and make a thin film of the syrup-starch slurry. Under the influence of the high surface temperature of the rollers, the partial gelatinization of the starch is accomplished using the water attached to the fructose and other sugar molecules in the corn syrup. This water is then evaporated from the resulting combination while the film is on the surface of the rollers. The speed at which the rollers turn controls the degree of gelatinization. The usual operation of a hot roll drier provides for the removal of the dried film from the surface of the rollers by a scraper blade. This blade is very sharp and is adjusted with a high degree of machining to the surface of the roller.

In practicing this invention, it has been found that if the speed of the rollers is too fast or if the combination of starch and high fructose corn syrup (with or without honey) is not properly compounded, the starch is then not gelatinized far enough by the time the film reaches the scraper blade. The result of this is a wet sticky mass which is obviously undried. If the starch is partially gelatinized, the film being scraped from the surface of the rollers by the blade will be continuous, although fragile, and will have a degree of tensile strength while it is warm which permits its transfer to other handling equipment. The gelatinization of the starch can go too far. This may result from operating the rollers too slowly or from other combinations of effects which will be described hereinafter. In this instance, the starch is fully gelatinized and may even be further to the point of total disorganization. This film being scraped from the surface of the rollers will be a relatively thick mass. It will be rubbery and have a high tensile strength. It will also be sticky and will form into rolls at the edge of the knife blade. It will not be a thin, continuous or somewhat fragile but handable sheet which is obtained when the degree of gelatinization is only partial. Full gelatinization of the starch is, from the experiences obtained in this invention, not desirable because it does not permit the product to be dried in any commercially feasible method.

In summation, the essential feature of this invention is to bring about partial gelatinization of the starch which results in a dried high fructose corn syrup (with or without honey solids) which, when cool, has a crystalline character permitting it to be ground into particles approximating that of sucrose cane sugar. These particles will be stable and will be relatively non-hygroscopic. The particles can be placed into 50 or 100 pound bags which in turn can be stored under normal warehouse conditions without the dried fructose corn syrup sugars reverting to their liquid state by absorbing moisture from the atmosphere. Fructose in any form has the characteristic of absorbing water from the atmosphere. It has this ability to an even greater extent if the fructose is dried. This is a natural characteristic of this form of sugar. This invention has successfully countered the tendency of the dried high fructose corn syrup to pick up moisture readily from the atmosphere. Furthermore, this invention yields a fructose-starch product which when used in bread baking for example, absorbs more water than that removed by the dehydration step of this invention. This water becomes tightly bound to the fructose-syrup-and partially-gelatinized-starch combination. The bread retains its softness of texture longer during storage than bread made with the liquid fructose corn syrup.

In carrying out this invention, the use of a deaerating substance, e.g., hydroxylated lecithin, glycerin monostearate and combinations of glycerin mono- and distearates, is important from a commercial manufacturing standpoint where hot roll drying is used by providing much greater ease of handling of the partially gelatinized-dried product as it is being peeled off the hot rolls by the knife blade. When the high fructose corn syrup, with or without honey, and the starch are being mixed together, the result is a rather viscous slurry in which air is easily entrapped by the agitator of the mixer. If this air is allowed to remain in the slurry, the sheet of dried material which results from the film of slurry picked up by the hot rolls tends to be porous and discontinuous at the knife blade. The hydroxylated lecithin (or other emulsifier) acts, therefore, as a deaerating agent in preventing the retention of air in the slurry and also as an aid in the release of the dried material at the knife blade. While drying could be done without the use of these aids, the drying is much improved and the handling is very definitely made easier when these deaerating agents are present.

The invention will be further illustrated but is not limited by the following examples in which the quantities are given in parts by weight unless otherwise indicated.

EXAMPLE 1

The following ingredients were combined:

| Ingredients | Pounds |
| --- | --- |
| High fructose corn syrup (H.F.C.S.) | 65.0 |
| Wheat starch | 34.5 |
| Hydroxylated lecithin | 0.5 |
| Total: | 100.0 |

The above ingredients were combined by placing the H.F.C.S. in a mixer with a sturdy agitator. This mixer has an agitator turning on a horizontal axis. The mixer tank is U-shaped on the cross section. The mixer is shaped as a partial spiral. Other mixers may be used provided that the agitator blades are of sturdy construction and are powered by a motor of sufficient strength to blend viscous materials. The mixer tank must be jacketed. The agitator may be of such construction that steam can be transmitted through it, in which case it serves as a source of heat rather than the jacket on the mixer tank.

The H.F.C.S. is placed in the mixer. The wheat starch is added in increments while the mixer is turning. After all the starch has been added, mixing is continued until a smooth slurry is obtained in which all of the starch is uniformly distributed throughout the corn syrup. At this point, steam is permitted to enter the mixer jacket or the agitator and the temperature is brought to 130° F. At this point, the hydroxylated lecithin is added and mixing is continued to deaerate the slurry. The time required for the first step in mixing depends upon the size of the mixer, but for the 100 pound batch shown in this example, approximately 7 to 10 minutes are required. An additional 5 minutes is required to deaerate.

When mixing and deaeration is complete, the steam is shut off and the mixer stopped. It is then allowed to stand for a minimum of 8 hours and as long as 16 hours. During this standing, the temperature will have dropped below 130° F.

The mixer is then started and heat is applied to return the temperature to 130° F. At this point, the slurry is ready for pumping to a hot roll drier.

Upon being pumped to the drier, the slurry is permitted to fall into the "nip" between the two counter-turning rollers. A level of approximately six to ten inches of slurry depth is maintained in the "nip" of the rollers on a drier having rollers which are 48 inches in diameter and 10 feet long.

The steam pressure in the rollers is maintained at an ideal of 85 pounds per square inch. The roller speed is ideally 2.5 revolutions per minute. It should be understood that steam pressure may be slightly increased if the roller speed is slightly increased. Conversely, steam pressure may be lowered by a few pounds from the ideal if the roller speed is reduced correspondingly. These are minor mechanical adjustments and are not essential features of the invention.

Adjustment of the aperture between the rollers is an important feature and must be observed along with the other feature which control the degree of gelatinization. Obviously, the aperture may vary relative to the amount of starch versus the amount of H.F.C.S. in the slurry. This is again a mechanical adjustment feature of the invention.

When all of the above features have been carefully controlled, as in this example, the film, when it reaches the knife blade, will be very easily shaved away from the surface of the hot rolls. The appearance of the sheet at the knife blade is that of a piece of thin white paper. It is limber because the temperature is still quite high. As cooling takes place, however, the sheet becomes rapidly fragile and shatterable. This is a matter of seconds. The sheet is easily then passed through a hammermill or other milling device to reduce the particle size to that desired. The ideal particle size is 100 percent through 30 mesh.

EXAMPLE 2

The following ingredients were combined:

| Ingredients | Pounds |
|---|---|
| High fructose corn syrup (H.F.C.S.) | 70.0 |
| Wheat starch | 29.5 |
| Hydroxylated lecithin | 0.5 |
| Total: | 100.0 |

All of the mixing and handling features are the same as in Example 1. The product coming from the knife blade is a smooth continuous sheet which upon cooling, grinds very easily.

EXAMPLE 3

The following ingredients were combined:

| Ingredients | Pounds |
|---|---|
| High fructose corn syrup (H.F.C.S.) | 50.0 |
| Wheat starch | 49.5 |
| Hydroxylated lecithin | 0.5 |
| Total: | 100.0 |

All of the features of mixing and other regulations were observed as in Example 1. The product coming from the knife blade is dry and upon cooling grinds quite readily into granular material.

EXAMPLE 4

The following ingredients were combined:

| Ingredients | Pounds |
|---|---|
| High fructose corn syrup (H.F.C.S.) | 65.0 |
| Wheat starch | 34.5 |
| Hydroxylated lecithin | 0.5 |
| Total: | 100.0 |

In this example, the slurry was heated to 130° F. and then immediately pumped to the hot roll drier. The sheet as formed at the knife blade was of very poor quality and gave great difficulty in handling. The sheet was sticky and wet, indicating insufficient drying. Increase of steam pressure did not relieve the situation, nor did reducing the speed of the driers. Examination of the finished product indicates that partial gelatinization of the starch to the ideal extent was not attained. This example indicates the need for holding the slurry at the ideal temperature of 130° F. for a sufficient length of time to permit the ideal degree of partial gelatinization of the starch to be attained.

EXAMPLE 5

The procedure was the same as in Example 1 except that the following ingredients were used:

| Ingredients | Pounds |
|---|---|
| High fructose corn syrup | 37 |
| Liquid honey | 33 |
| Wheat starch | 29.5 |
| Hydroxylated lecithin | 0.5 |

The product was a composite with a honey flavor.

EXAMPLE 6

The procedure was the same as in Example 1 except that the following ingredients were used:

| Ingredients | Pounds |
|---|---|
| High fructose corn syrup | 33 |
| Liquid honey | 37 |
| Wheat starch | 29.5 |
| Hydroxylated lecithin | 0.5 |

The product was a composite with a honey flavor.

The following examples will show that the temperature to which the slurry is heated is important, even when it is allowed to stand for the apparently important eight to sixteen hours before being hot roll dried. It should be noted that this invention is not limited to allowing the slurry to stand for 8 to 16 hours, but the proper amount of conditioning must be effected so that upon dehydration partial gelatinization is attained. If this can be done by varying the heating and the standing period, then the invention will have been met in that partial gelatinization will have been attained.

In Examples 7 through 10, the following mixture was made in each case:

| Ingredients | Pounds |
|---|---|
| High fructose corn syrup (H.F.C.S.) | 65.0 |
| Wheat starch | 34.5 |
| Hydroxylated lecithin | 0.5 |
| Total: | 100.0 |

EXAMPLE 7

The temperature of the slurry was raised to 120° F. The heat was then turned off and the slurry was allowed to stand for 16 hours. It was then reheated to 120° F. and then pumped to the roll drier. The sheet at the knife blade was slightly sticky, wet, and handled with difficulty.

EXAMPLE 8

The procedure was the same as in Example 7 except the temperature used was 140° F. This slurry handled as well as that in Example 1, where the temperature was 130° F.

EXAMPLE 9

In this example the procedure was the same as in Example 7 except that the temperature of the slurry was 150° F. In this case, the sheet was slightly rubbery at the knife blade, indicating gelatinization had gone too far.

EXAMPLE 10

In this example the procedure was the same as in Example 7 except that the temperature used was 160° F. The sheet at the knife blade was very thick and rubbery and could not be easily handled. Examination of a small amount of this material indicated that the gelatinization had gone too far.

Examples 1 to 4 illustrate various quantities of starch which can be used with the high fructose corn syrup. Obviously, the ideal product is made with as little wheat starch as possible, thereby making the dry product have a relatively higher fructose corn syrup solids content. The quantity of starch, however, does affect the degree of gelatinization, since this is related to the quantity of water in the fructose corn syrup.

Examples 5 and 6 illustrate composite products containing high fructose corn syrup solids and honey solids. A preferred weight ratio of high fructose corn syrup solids to honey solids is 15:85 to 85:15.

Examples 7 and 10 show the influence of temperature on the slurry prior to pumping it to the hot roll drier. It should be noted here that the ideal temperature to condition the starch for gelatinization is 130° F. This is well below the temperature necessary for gelatinization of starch in water solution alone. Gelatinization of wheat starch in water generally begins at about 160° F. The gelatinization temperature of wheat starch in a simple sugar and water solution is higher than that for the same starch in water alone. Therefore, gelatinization is not begun during the slurry-heating step but later in the dehydration step.

In the examples the high fructose corn syrup used was the typical high fructose corn syrup previously described containing 29.0 percent water and 71 percent solids. A commercially available product is "Isomerose 100."

The products are dry appearing flowable powders free of gummy, sticky and lumpy characteristics. Where the products are to be stored over long periods of time it is sometimes desirable to add an anti-humectant, usually in amounts not exceeding 1 percent by weight of the product, preferably 0.5 to 1 percent. Examples of anti-humectants are calcium stearate, micronized silica, tricalcium phosphate and magnesium carbonate. The anti-humectant can be mixed with the product during grinding. A preferred anti-humectant is calcium stearate.

The invention is hereby claimed as follows:

1. A process for dehydrating high fructose corn syrup which comprises intimately mixing said syrup with an ungelatinized starch having a gelatinization temperature of at least 150° F. in sufficient amount to form a slurry, heating said slurry at a temperature 15 to 30 degrees below the gelatinization temperature of said starch and holding said slurry at said temperature until the starch is conditioned to the extent that it will only partially gelatinize when subsequently heated above the gelatinization temperature, and subsequently subjecting said slurry in a thin film to a heated surface above said gelatinization temperature for a period of time sufficient to dehydrate said slurry and simultaneously to partially gelatinize said starch, the quantity of said starch and the degree of gelatinization being sufficient to give a product which when ground forms a dry appearing flowable powder, free of gummy, sticky and lumpy characteristics.

2. A process as claimed in claim 1 in which said slurry is deaerated while it is being heated below the gelatinization temperature of said starch.

3. A process as claimed in claim 2 in which an emulsifier is added in sufficient amount to enhance deaeration.

4. A process as claimed in claim 3 in which hydroxylated lecithin is added as the emulsifier.

5. A process as claimed in claim 1 in which the ungelatinized starch is wheat starch.

6. A process as claimed in claim 1 in which honey is mixed with said high fructose corn syrup in a weight ratio of honey solids to high fructose corn syrup solids within the range of 15:85 to 85:15.

7. A process as claimed claim 1 in which the slurry is formed into a thin film and dried to a paper thin sheet by flowing it into the nip of two closely spaced counter rotating rollers having a surface temperature of 325° to 375° F. for a contact time of 5 to 30 seconds.

8. A solidified product in the form of a dry appearing flowable powder, free of gummy, sticky and lumpy characteristics produced by the process of claim 1.

9. A product resulting from the process of claim 4.

10. A product resulting from the process of claim 6.

* * * * *